United States Patent Office 2,772,177
Patented Nov. 27, 1956

2,772,177

SILICATE GLASS ADHESIVE

James G. Lander, Painesville, Ohio, assignor to Diamond Alkali Company, Cleveland, Ohio, a corporation of Delaware No Drawing. Application September 22, 1952,
Serial No. 310,921

2 Claims. (Cl. 106—79)

This invention relates to a composition of matter comprising aqueous adhesive silicate glass, which composition is characterized by high adhesiveness to cellulose-containing materials, such as paper surfaces employed in laminated paper articles, but which is also characterized by lack of adhesion to heated metal surfaces. It relates also to the method of preparing boxboard which includes use of the new composition.

One of the steps of a typical paper laminating operation involves the pressing of the composite sheet after the adhesive has been applied to the plies and such plies have been arranged in laminated relationship. Generally, in the manufacture of corrugated paperboard, this operation is conducted by passing an advancing laminated web of paper over a series of heated platens and pressing the web against the heated platens by means of one or more rollers, whereby the silicate glass is dehydrated and the laminations are united, thus forming a bond between the laminates.

In the manufacture of corrugated paperboard and similar laminates, the silicate glass adhesive may, for example, be applied to the peaks of the corrugations on one side of a corrugated sheet, which sheet is then contacted with a plane-surface facing sheet, and the composite thus formed passed over heated platens, while being subjected to pressure insufficient to destroy the corrugations of the corrugated member but sufficient to effect the bonding of the paper sheets. Thereafter, in accordance with this exemplary method of forming 3-ply laminates, the laminated structure may be coated a second time with an adhesive silicate glass at the peaks of the exposed corrugated surface of the laminate, and the thus-coated structure then formed brought into contact with a second plane-surface and the whole laminate again passed in contact with heated platens, while being subjected to pressure insufficient to destroy the corrugations of the corrugated member but sufficient to effect bonding of the laminate.

Difficulties in the manufacture of such corrugated paperboard arise when aqueous adhesive silicate glass comes into contact with the corrugating and pressure rolls, and the platens of the hot plate driers, forming hard glass-like deposits thereon, thus fouling the rolls and necessitating interrupting production to remove said deposits. Further, as the laminated structure passes between the pressure rollers and the platens of the hot-plate driers, some of the adhesive silicate glass exudes from the portions of the laminate nearest the edges thereof and deposits upon the heated surface of the platens. After a relatively short period of time, these deposits of the exuded adhesive silicate material accumulate upon the surface of the platens and build up into ridges or mounds near the region of the edges of the moving laminated web and under the influence of the relatively intense heat of the platen surface are dehydrated to a hard, strongly adherent, solid silicate glass. These deposits are then in a position to effect the destruction of the edges of the moving laminated structure passing across the heated platen surface. Moreover, as the production of laminated webs of lesser and greater widths may be scheduled alternately during a given production period, the changeover from the lesser to the greater widths may leave deposits of the dehydrated silicate glass in a position to mar substantial areas longitudinally of the wider webs. When the accumulation of the deposits of dehydrated silicate glass are sufficient to cause the destruction of substantial areas of the wider laminated webs passing thereover, the whole operation must be interrupted and the heated platens cleaned before further production of such wider webs may be started. A major difficulty in the cleaning operation arises from the fact that the dehydrated silicate glass adheres quite strongly to the platens, requiring considerable time and hand labor to dislodge the deposit and refinish the surface.

The present invention is directed to a composition and method for decreasing the adhesion of an adhesive silicate glass composition to heated metal surfaces generally.

Another object of the invention is to provide a method and composition for preventing the adhesion of aqueous adhesive silicate glasses commonly employed in the paper laminating industry to the heated metal surfaces of the platens used for forming laminates.

These and other objects will occur to those skilled in the art from the description of the invention set forth below.

The present invention contemplates the combination of a major proportion of aqueous silicate solution of materials which, while they do not interfere with the ultimate adhesiveness of the dehydrated adhesive silicate glass, nevertheless provide properties of non-adhesiveness to the heated metallic surfaces which come in contact with the composition, especially parts of boxboard manufacturing equipment.

The compositions of the invention include, in addition to the adhesive sodium silicate solution, suitable quantities of urea, which may be ordinary technical grade, sugar, which may suitably be the cheapest obtainable, such as tanners sugar, alkaline earth metal sulfate, such as magnesium sulfate, alkali metal chromate or bichromate, suitably sodium bichromate, a finely divided clay, which may be any predominantly aluminum silicate material of sufficient fineness, i. e., of the order of the average particle size of a few microns diameter, and of which Barden clay, a grade designation of J. M. Huber Corporation, of New York, N. Y., for a kaolin type hydrated aluminum silicate obtained from the mineral kaolinite, is satisfactory, and water. No criticality lies in the manner of combining these ingredients but it has been found convenient to dissolve the sugar initially in relatively hot water, such as of the order of 150° F., add the urea to the sugar solution, whereupon the temperature of the solution decreases, depending upon the amount of urea, to below 100° F., add the alkaline earth metal sulfate and the alkali metal chromate or bichromate, and when this combination of materials is thoroughly homogeneous, add it to the silicate solution with vigorous agitation and in relatively small increments. Finally, to complete the composition, the clay is added.

The method of the invention may suitably be carried out by employing a composition prepared as described above in a known type of boxboard or other laminated paper manufacturing machine and in a manner entirely equivalent to that used for ordinary untreated silicate adhesive.

While the relative proportions of the materials in the composition of the invention are not highly critical, it has been found that suitable materials, in the sense of high adhesiveness to boxboard structures and low adhesiveness to heated surfaces of boxboard machines, the latter being sufficiently low so that a moving web of paper dislodges deposits without damage to the paper, comprise between 75-85% of aqueous silicate glass solution containing 35-45% solids and averaging on the weight basis 1 part of $Na_2O$ to between 2.5 and 4 parts of $SiO_2$, and suitably within the range of $1Na_2O$ to $3-3.5SiO_2$, preferably about $1Na_2O$ to 3.3 parts of $SiO_2$, and which may suitably contain a small amount of an anionic wetting agent, of which aromatic monosodium sulfonate derived from petroleum oil, alkyl aryl sulfonates, coconut oil sulfonates, and the like are examples, an exemplary quantity being about 1%, between 2 and 10% of urea, between 0.5 and 3% of sugar, between 0.1 and 1% of alkali metal bichromate, between 1 and 4% of alkaline earth metal sulfate, and the balance to make 100% water.

In order that those skilled in the art may have a clearer understanding of the invention and its preferred mode of practice, the following specific example is offered:

Example

A composition is formulated as follows:

| | Percent |
|---|---|
| Sodium silicate solution containing 1% alkyl aryl sulfonate wetting agent (40.8° Bé.), 38.3% solids ($Na_2O:SiO_2$ ratio, 1:3.3) | 71.3 |
| Urea | 5.0 |
| Tanners sugar | 1.0 |
| Sodium bichromate | 0.3 |
| Magnesium sulfate | 1.4 |
| Barden clay | 8.0 |
| Water | 13.0 |

The order of combining the ingredients is as described hereinabove. This composition is employed as an equivalent of prior art aqueous adhesive silicate solutions in the automatic manufacture of paperboard. The paperboard produced is equivalent in every respect to that produced with prior art aqueous silicate solutions, but the action of the composition of this example on the hot metallic surfaces of the paperboard machine, including the platens, is notably different, in that the same, when dried on such hot surfaces is readily dislodged by the passage of further paperboard in contact therewith and without damage to such paperboard.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A composition of matter comprising:

| | Percent |
|---|---|
| Aqueous silicate glass solution ($Na_2O:SiO_2$ ratio, 1:2.5–4, 35–45% solids) | 75–85 |
| Urea | 2–10 |
| Sugar | 0.5–3 |
| Sodium bichromate | 0.1–1 |
| Magnesium sulfate | 1–4 |
| Barden clay | 0–8 |
| Water | Balance to 100 percent |

2. A composition of matter comprising:

| | Percent |
|---|---|
| Aqueous silicate glass solution ($Na_2O:SiO_2$ ratio, 1:2.5–4, 35–45% solids plus about 1% of anionic wetting agent) | 71.3 |
| Urea | 5.0 |
| Tanners sugar | 1.0 |
| Sodium bichromate | 0.3 |
| Magnesium sulfate | 1.4 |
| Barden clay | 8.0 |
| Water | 13.0 |

No references cited.